(12) United States Patent
Mottaez et al.

(10) Patent No.: US 8,799,843 B1
(45) Date of Patent: Aug. 5, 2014

(54) IDENTIFYING CANDIDATE NETS FOR BUFFERING USING NUMERICAL METHODS

(71) Applicant: Synopsys, Inc., Mountain View, CA (US)

(72) Inventors: Amir H. Mottaez, Los Altos, CA (US); Mahesh A. Iyer, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/016,026

(22) Filed: Aug. 30, 2013

Related U.S. Application Data

(60) Provisional application No. 61/860,179, filed on Jul. 30, 2013.

(51) Int. Cl.
*G06F 17/50* (2006.01)
(52) U.S. Cl.
USPC ........................................... 716/114
(58) Field of Classification Search
USPC ........................................... 716/114
See application file for complete search history.

(56) References Cited

U.S. PATENT DOCUMENTS

| 2006/0190886 A1* | 8/2006 | Lu et al. ............................. 716/6 |
| 2008/0276212 A1* | 11/2008 | Albrecht ........................ 716/10 |
| 2011/0252389 A1* | 10/2011 | Albrecht et al. .............. 716/108 |
| 2013/0208595 A1* | 8/2013 | Connolly et al. .............. 370/235 |

* cited by examiner

*Primary Examiner* — Vuthe Siek
*Assistant Examiner* — Mohammed Alam
(74) *Attorney, Agent, or Firm* — Park, Vaughan, Fleming & Dowler LLP; Laxman Sahasrabuddhe

(57) ABSTRACT

Systems and techniques are described for efficiently and accurately identifying candidate nets that would benefit from buffering. A buffering process can then be performed only on the identified candidate nets. Embodiments described herein can quickly and accurately identify nets for which performing buffering optimization would most likely waste computational time (so they can be skipped for the buffering transformation), thereby improving the overall performance of buffering optimization and overall physical synthesis optimization. Some embodiments use a buffer topology generating process to generate a buffer topology for a net and then use a numerical sizing process to size the buffers in the buffer topology and the driver gate.

15 Claims, 5 Drawing Sheets

IDENTIFYING CANDIDATE NETS FOR BUFFERING USING NUMERICAL METHODS

RELATED APPLICATION

This application claims priority to U.S. Provisional Patent Application No. 61/860,179, entitled "Method and apparatus for identifying candidate nets for buffering using numerical methods," by the same inventors, and was filed on 30 Jul. 2013, the contents of which are herein incorporated by reference in their entirety for all purposes.

BACKGROUND

1. Technical Field

This disclosure relates to electronic design automation (EDA). More specifically, this disclosure relates to identifying candidate nets for buffering using numerical methods.

2. Related Art

Insertion of repeaters on wires can dramatically reduce the delay from the driver of a net to one or more of its sinks. The related optimization problem (referred to as buffering or repeater insertion) is well known and many different approaches have been proposed for solving the optimization problem. Unfortunately, conventional approaches assume that a net (wire) that requires buffering has been identified and the only problem is to determine an optimal buffering solution. Furthermore, all nets do not benefit from repeater insertion. Although long wires can benefit from repeater insertion, other wires can actually degrade in delay when they are buffered. Indeed, for such wires, some conventional buffering approaches find that the no-buffer solution is optimal. However, in conventional approaches, such a "no-buffer solution is optimal" determination is only arrived at once the approach completes its computation. Consequently, conventional approaches tend to spend the same amount of time performing buffering computations even if no buffering is eventually performed (because the approach determines that the no buffering solution is optimal).

In addition, many conventional buffering approaches have a two phase approach, wherein in the first phase they construct a buffer topology, and in the second phase they size the buffers associated with the constructed topology. Most of the run-time of such conventional approaches is spent during the second phase, i.e., buffer sizing phase.

What are needed are systems and techniques for performing fast and accurate buffering (also known as repeater insertion).

SUMMARY

Some embodiments described herein provide systems and techniques for identifying candidate nets for buffering using numerical delay models. A numerical delay model tries to capture the delay behavior of multiple library cells in a numerical delay model. The numerical delay model can then be used by numerical optimization techniques (described below) to determine optimal cell sizes. Note that such numerical circuit optimization techniques are fundamentally different from, and significantly faster than, conventional trial-and-error optimization techniques that iterate through different cells in a cell library to determine the optimal cell size.

Some embodiments of the present invention use the numerical delay models to quickly and accurately determine whether or not buffering a net is expected to improve delay. If buffering is expected to improve delay, then buffering optimization (which is a computationally intensive process) can be performed on the net. If buffering is not expected to improve delay, then buffering optimization can be skipped, thereby saving a significant amount of computational time that would have otherwise been spent unnecessarily trying to optimize a net for which buffering is most likely not going to improve delay.

Specifically, some embodiments can receive a net that electrically connects an output of a driver gate with a set of sinks. Next, the embodiments can determine whether or not buffering is expected to improve a delay of a path that passes through the net by at least using logical effort and parasitic delay values of the driver gate and logical effort and parasitic delay values of one or more buffers from a technology library. If buffering is expected to improve the delay of the path, the embodiments can perform buffering optimization on the net. On the other hand, if buffering is not expected to improve the delay of the path, the embodiments can skip performing buffering optimization on the net.

In some embodiments, determining whether or not buffering is expected to improve the delay of the path can include evaluating a closed-form expression that returns the optimal number of buffers on the net. If the closed-form expression indicates that adding one or more buffers would result in an optimal delay, then the embodiment can conclude that buffering is expected to improve delay. If the closed-form expression indicates that buffering would not improve the delay, then the embodiments can either skip buffering, or try one or more accurate techniques for determining whether or not buffering is expected to improve delay.

In some embodiments, determining whether or not buffering is expected to improve the delay of the path includes: (1) determining a first delay from an input of the driver gate to the set of sinks; (2) evaluating a closed-form expression to determine an optimal buffer size for a candidate buffer that is being added to the net; (3) determining a second delay from the input of the driver gate to the set of sinks assuming that the one or more buffers with their optimal buffer sizes have been added to the net; and (4) comparing the first delay with the second delay. If the second delay is less than the first delay, then the embodiments can conclude that buffering is expected to improve the delay of the path. On the other hand, if the second delay is greater than or equal to the first delay, then the embodiments can either skip buffering, or try more accurate techniques for determining whether or not buffering is expected to improve the delay of the path.

In some embodiments, determining whether or not buffering is expected to improve the delay of the path includes: (1) determining a first delay from an input of a source gate to the set of sinks, wherein an output of the source gate is electrically connected to the input of the driver gate; (2) evaluating closed-form expressions to determine an optimal buffer size for a candidate buffer that is being added to the net, and an optimal gate size for the driver gate; (3) determining a second delay from the input of the source gate to the set of sinks assuming that the one or more buffers with their optimal buffer sizes have been added to the net and the driver gate has the optimal gate size; and (4) comparing the first delay with the second delay. If the second delay is less than the first delay, then the embodiments can conclude that buffering is expected to improve the delay of the path. On the other hand, if the second delay is greater than or equal to the first delay, then the embodiments can either skip buffering, or try more accurate techniques for determining whether or not buffering is expected to improve the delay of the path.

In some embodiments, determining whether or not buffering is expected to improve the delay of the path includes: (1)

using a buffer topology generating process to generate a buffer topology for the net; (2) if the buffer generating process was unable to generate a buffer topology, determining that buffering is not expected to improve the delay of the path; and (3) if the buffer generating process was able to generate a buffer topology, then performing the following operations: (3a) sizing buffers and the driver gate using a numerical sizing process, (3b) determining a second delay from the input of the source gate to the set of sinks assuming that the one or more buffers with their optimal buffer sizes have been added to the net and the driver gate has the optimal gate size, and (3c) comparing the first delay with the second delay. If the second delay is less than the first delay, then the embodiments can conclude that buffering is expected to improve the delay of the path. On the other hand, if the second delay is greater than or equal to the first delay, then the embodiments can skip buffering.

DETAILED DESCRIPTION

Figure 1:
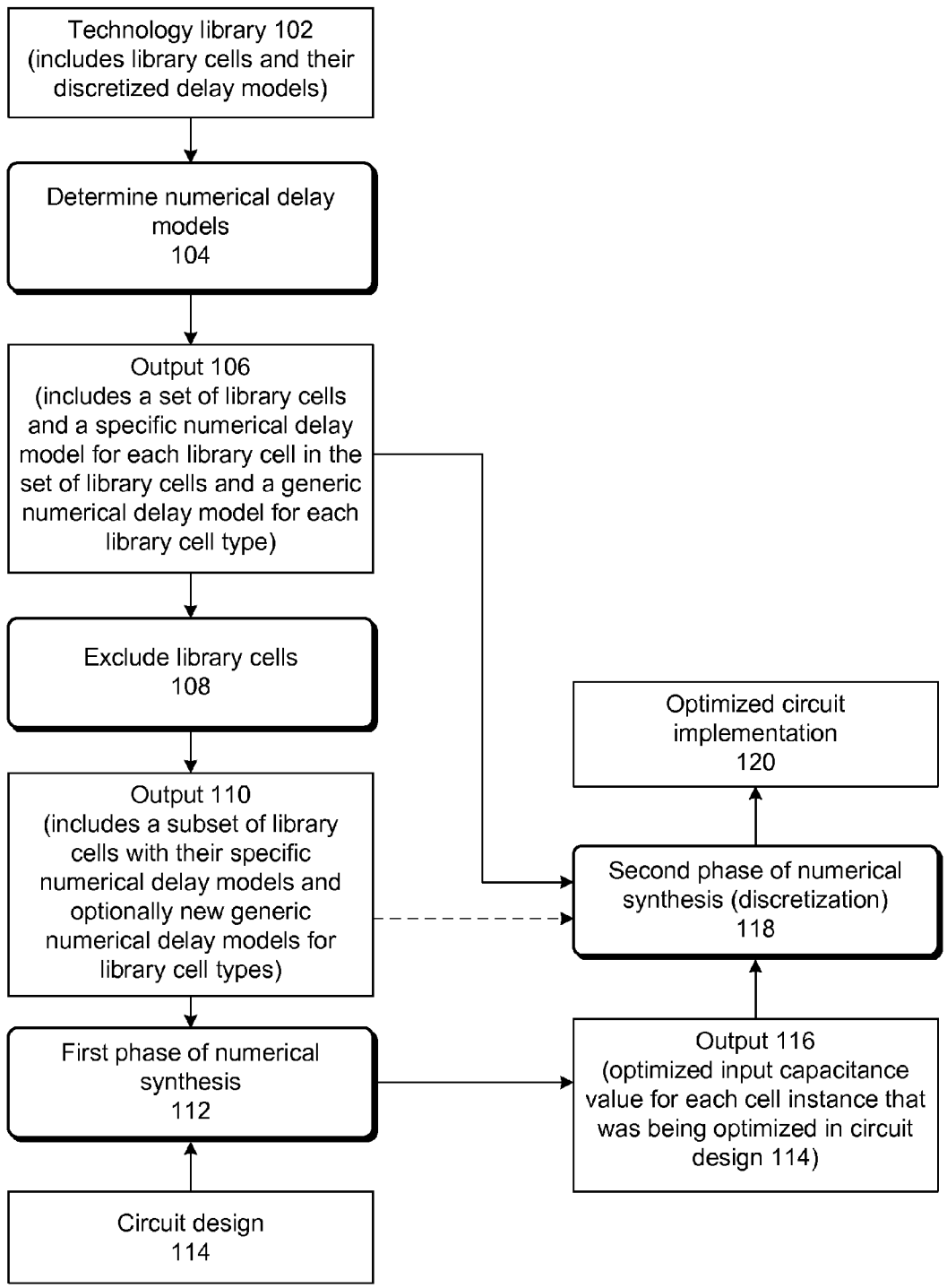
FIG. 1 illustrates a numerical synthesis process in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z.

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are illustrative purposes only and are not intended to limit the embodiments to the forms disclosed.

Some EDA software tools enable circuit designers to describe the functionality that they want to implement. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Identifying Candidate Nets for Buffering

Some embodiments of the present invention efficiently and accurately identify candidate nets that would benefit from buffering. A buffering process can then be performed only on the identified candidate nets. In other words, some embodiments of the present invention can quickly and accurately weed out nets for which the buffering process would have returned a "no buffering is the optimal solution" result, thereby improving the overall performance of the buffering approach. The terms "buffer" and "repeater" are used interchangeably in this disclosure.

Conventional buffering approaches utilize one of the two following approaches for net buffering candidate selection. The first approach is a brute-force approach in which buffering is tried on all nets on the critical paths identified by the delay optimization tool and the benefit of buffering versus other transformations such as sizing-only is evaluated for each net. For example, such a conventional approach would first select a driver to optimize (improve) on a critical path. The conventional approach tries buffering the net being driven by the driver as well as other transformations such as sizing. The approach selects the buffering process's results if it yields an improvement and the improvement is better than the other transformations (e.g. sizing). As mentioned above, the problem with such approaches is that the run-time intensive buffering process is applied to every possible candidate net on the critical path. More importantly, the buffering solution may be inferior to other transformations that are tried, further representing wasted computational effort.

The second net buffering candidate selection approach that is used by conventional buffering tools is the rule-based approach. In this approach, the buffering tool applies a rule to select candidate nets for buffering. The rules are rudimentary, e.g., the rule may use wire-length (or other proxies such as number of fan-outs, total wire capacitance and/or total wire resistance) to identify nets that can benefit from buffering. Although such rule based approaches are fast, they can lead to significantly suboptimal results (by missing buffering candidate nets) or waste run-time (by identify false candidates).

Some embodiments of the present invention include one or more of the following features.

Some embodiments utilize numerical methods to identify nets that are suitable candidates for buffering.

Some embodiments can be implemented as a filter that operates during an existing delay optimization process. Specifically, as part of improving the slack of a particular end-point (or a set of end-points), the embodiment can identify a driver to optimize (i.e., a candidate driver whose delay needs improvement). For example, some buffering tools select a driver on the critical path with the worst slew. Some embodiments of the present invention would determine if repeater insertion is an appropriate transformation for the driver. If the filter identifies the driver as a buffering candidate, then buffering is considered as a possible transformation on the driver. Otherwise buffering is excluded and other transformations (e.g. sizing) are performed.

Some embodiments can be implemented as an overall buffering candidate selection process that operates during the buffering phase of circuit optimization. For example, these embodiments can look at all nets of the design that are critical and/or near critical and select a subset of nets that are identified by the numerical synthesis based approach for identifying buffering candidates.

In embodiments that are implemented as a filter (rather than a process to implement and compute the actual improvement), the embodiments can use a numerical model to evaluate the delay of the original circuit (driver, its fan-in driver, and its loads) versus the delay that is obtained by numerical sizing of the driver and/or its loads versus the delay that is obtained by numerical repeater insertion. Specifically, many different approaches are possible, as shown below.

If repeater insertion shows an improvement versus original circuit, then the driver is considered for buffer insertion.

If repeater insertion shows an improvement over original circuit as well as numerical sizing of driver and/or its sinks (without repeater insertion), then the driver is considered for buffer insertion.

If the numerical synthesis process determines the driver as a repeater insertion candidate, then only repeater insertion is considered. In a variation, the numerical synthesis process is only used to reject repeater insertion as a possible transformation, i.e., when the numerical synthesis process determines the candidate as a repeater insertion candidate, both accurate repeater insertion as well as accurate sizing of the driver and/or its sinks is tried.

The sections shown below are organized as follows. First, we describe a numerical synthesis approach that can quickly and accurately perform gate sizing in a circuit design. Next, we describe systems and processes for quickly and accurately identifying candidate nets for buffering. Specifically, we describe multiple filtering approaches for quickly and accurately identifying candidate nets for buffering. In some embodiments, if any (or some subset of) the filtering approaches show an improvement, then the driver is considered as a repeater insertion candidate. In other embodiments, all filtering approaches need to show an improvement in order for the driver to be considered as a repeater insertion candidate.

Numerical Synthesis

A circuit synthesis approach that is different from iterative trial-and-error approaches is described in Ivan Sutherland, Robert F. Sproull, and David Harris, *Logical Effort: Designing Fast CMOS Circuits*, Morgan Kaufmann 1999 (hereinafter "Sutherland"). The cell delay can be represented using the following expression:

$$d = R \cdot C_o + p, \quad (1)$$

where, R is the output resistance of the cell, $C_o$ is the output loading, and p is the parasitic delay of the cell. Equation (1) can then be rewritten as:

$$d = (R \cdot C_i) \cdot \left(\frac{C_o}{C_i}\right) + p, \quad (2)$$

where, $C_i$ is the input capacitance presented by the cell at one of its input terminals.

The circuit synthesis approach described in Sutherland uses the following linear cell delay model:

$$d = g \cdot h + p \quad (3)$$

where, g represents the logical effort, h represents the electrical effort, and p represents the parasitic delay of the cell. The logical effort captures the effect of the cell's topology on its ability to produce output current. The logical effort is independent of the size of the transistors in the circuit. The electrical effort describes how the electrical environment of the cell affects performance, and how the size of the transistors in the cell determines its load-driving capability. The parasitic delay is a form of delay overhead that accompanies any gate. The logical effort g and the parasitic delay p can be normalized, e.g., they can be normalized with respect to the logical effort and parasitic delay values, respectively, of a reference inverter. Comparing Equations (2) and (3) we note that the first term $(R \cdot C_i)$ represents the logical effort g, and the second term $$\left(\frac{C_o}{C_i}\right)$$

represents the electrical effort h.

FIG. 1 illustrates a numerical synthesis process in accordance with some embodiments described herein. Technology library 102 includes library cells and discretized non-linear delay models for the library cells. The library cells in the technology library 102 can be used to create and/or optimize a circuit design. The term "library cell" refers to a cell in a technology library. The term "library cell" is to be distinguished from the term "cell instance" which is an instantiation of a library cell in a circuit design. In some embodiments, a discretized delay model models the delay for a timing arc of a library cell.

The term "library cell type" refers to a particular logical functionality. Examples of functionalities include, but are not limited to, "AND," "OR," "XOR," "multiplexor," etc. The term "library cell" refers to a particular implementation of a library cell type. A technology library can be viewed as a collection of library cells of one or more library cell types. For example, a technology library may include multiple sizes of an inverter. In this example, the term "inverter" is the library cell type, and the term "library cell" refers to an inverter implementation of a particular size.

A numerical delay model is a delay model that can be used by a numerical solver to optimize a cost function. A linear delay model is one example of a numerical delay model. More generally, an analytical formula that represents the delay behavior is an example of a numerical delay model.

The term "specific numerical delay model" refers to a numerical delay model that models the delay behavior of a particular timing arc of a particular library cell, or the delay behavior of a particular library cell. A specific numerical delay model is defined using a specific logical effort value and a specific parasitic delay value.

The term "generic numerical delay model" refers to a numerical delay model that models an aggregated delay behavior of either a timing arc of a library cell type or the library cell type itself. A generic numerical delay model is defined using a generic logical effort value and a generic parasitic delay value.

Examples of systems and techniques that can be used to determine specific and generic numerical delay models (which can be used to perform operation 104) are described in U.S. patent application Ser. No. 13/450,178, entitled "Numerical delay model for a technology library cell and/or a technology library cell type," the contents of which are herein incorporated by reference in their entirety.

Some embodiments determine numerical delay models based on technology library 102 (operation 104). Output 106 of operation 104 can include a set of library cells and a specific numerical delay model for each library cell in the set of library cells and a generic numerical delay model for each library cell type. The set of library cells in output 106 typically includes all library cells in technology library 102, but in some embodiments certain library cells may be removed if desired.

Certain library cells can then be excluded (operation 108) to obtain a subset of library cells. Each library cell in the subset of library cells has a specific numerical delay model that was computed in operation 104. In some embodiments, a new generic numerical delay model can be determined for each cell type based on the specific numerical delay models corresponding to the subset of library cells. These generic numerical delay models are "new" because they are based on the subset of library cells as opposed to being based on the set of library cells that were used in operation 104 to determine the generic numerical delay models. Output 110, i.e., the subset of library cells with their specific numerical delay models and optionally the new generic numerical delay models for the library cell types, can then be provided as input to the first phase of numerical synthesis 112.

Examples of systems and techniques that can be used to exclude library cells (which can be used to perform operation 108) are described in U.S. patent application Ser. No. 13/479,807, entitled "Excluding library cells for delay optimization in numerical synthesis," the contents of which are herein incorporated by reference in their entirety.

The first phase of numerical synthesis 112 sizes cells in circuit design 114 using the subset of library cells with their specific numerical delay models and the new generic numerical delay models. In some embodiments, the first phase of numerical synthesis 112 models a numerical optimization problem based on circuit design 114 and the specific and generic numerical models for the subset of library cells. Output 116 from the first phase of numerical synthesis 112 includes the numerically optimized size for each cell instance in circuit design 114. Specifically, in some embodiments, output 116 includes the numerically optimized (and desired) input capacitance value for each cell instance that was being optimized in the circuit design 114. The optimization can be performed iteratively, wherein a subset of cells of circuit design 114 is optimized in each iteration.

Examples of systems and techniques that can be used to create and solve numerical circuit optimization problems are described in U.S. patent application Ser. No. 13/563,316, entitled "Optimizing a circuit design for delay using load-and-slew-independent numerical delay models," and U.S. patent application Ser. No. 13/562,189, entitled "Determining optimal gate sizes by using a numerical solver." The contents of both of these patent applications are herein incorporated by reference in their entirety.

Output 116 is then provided as one of the inputs to the second phase of numerical synthesis (discretization) 118. The other inputs to second phase of numerical synthesis 118 include the library cells in technology library 102 and output 106 (which includes the numerical delay models that were generated by operation 104). The second phase of the numerical synthesis 118 then instantiates cells that have the numerically optimized and desired cell sizes in circuit design 114 to produce optimized circuit implementation 120 using the discrete library cells from the technology library. In particular, for each cell instance in circuit design 114, the second phase of numerical synthesis 118 selects a library cell that best matches the numerically optimized size, (if a library cell with exactly the optimized size is not available, a library cell with nearly the optimized size is selected) from the set of library cells that were part of output 106. The term "discretization" can refer to the process of selecting an actual library cell (or selecting a parameter value—e.g., input capacitance value—that corresponds to an actual library cell) from the technology library based on the optimized parameter value (e.g., optimized input capacitance value) that was determined by the first phase of numerical synthesis 112. Examples of systems and techniques that can be used to discretize gate sizes are described in U.S. patent application Ser. No. 14/016,010, entitled "Discretizing gate sizes during numerical synthesis," by inventors Amir H. Mottaez and Mahesh A. Iyer, the contents of which are herein incorporated by reference in their entirety.

In some embodiments, second phase of numerical synthesis 118 also receives output 110 as input (shown in FIG. 1 using a dashed line). Specifically, second phase of numerical synthesis 118 uses the fact that certain cells were excluded from output 106 to determine which cells to instantiate. If the user marks certain library cells as "do not use" cells, then the optimization process does not use them.

The reason a subset of library cells is used in the first phase and the set of all library cells is used in the second phase is as follows. The first phase determines numerically optimized cell sizes by solving a numerical optimization problem. In this phase, it is desirable to restrict the search space to library cells that can be accurately modeled using a logical effort and parasitic delay based numerical modeling approach. Therefore, a subset of library cells is used in this phase to restrict the search space. Once the numerically optimized cell sizes have been determined, it is important to enable the circuit synthesis process to select cell instances from a wide range of library cells. Therefore, in the second phase, the restriction on the search space is relaxed and the set of library cells that was in output 106 is used.

Filtering Approach: Closed-Form Expression

This filtering approach involves constructing a closed-form expression for computing the optimal number of repeaters on a wire assuming zero wire load. Specifically, this approach assumes the wire being driven by the driver candidate has negligible wire resistance and uses a closed form to compute the number of repeaters that lead to optimal delay to the loads. This approach is effective when a wire's total pin capacitance and wire capacitance dominates and the wire resistance can be ignored.

Figure 2:
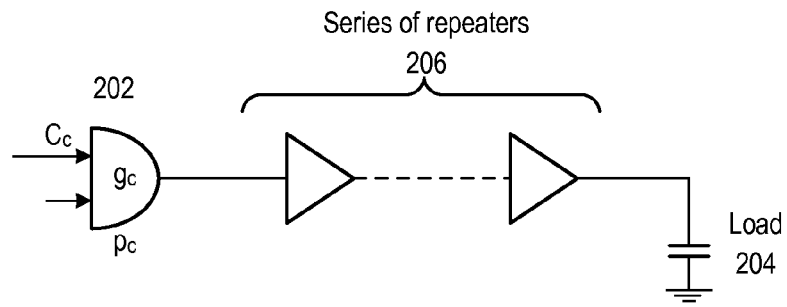
FIG. 2 illustrates a portion of a circuit design in accordance with some embodiments described herein.

FIG. 2 illustrates a portion of a circuit design in accordance with some embodiments described herein. Driver gate 202 drives load 204 through a series of repeaters 206. In the following derivation, the input capacitance of driver gate 202 is $C_c$, the logical effort and parasitic delay of driver gate 202 are $g_c$ and $p_c$, respectively, the logical effort and parasitic delay of each repeater are $g_c$ and $p_c$, respectively, D is the total delay (i.e., delay from the input pin of driver gate 202 to load 204), N is the optimal number of stages (number of buffers plus the candidate driver), and F is the path effort. The delay D can be expressed as:

$$D = N \cdot F^{1/N} + N \cdot p_r + p_c, \text{ where } F = g_c \cdot g_r^N \cdot \frac{L}{C_c}. \quad (4)$$

We can normalize the logical effort values with respect to the logical effort value of a repeater as follows:

$$g_r = 1, g = \frac{g_c}{g_r}, \text{ and } F = \frac{g \cdot L}{C_c}.$$

Rewriting Equation (5) with the normalized logical effort values, we obtain:

$$D = N \cdot \left(\frac{g \cdot L}{C_c}\right)^{\frac{1}{N}} + N \cdot p_r + p_c. \quad (5)$$

The optimal value of N is achieved when the partial derivative of D with respect to N is equal to zero. If we take the partial derivative of D with respect to N in Equation (5) and set it to zero, and then rearrange terms, we obtain:

$$\frac{p_r}{e} = \left(\frac{\ln F}{N} - 1\right) \cdot e^{\left(\frac{\ln F}{N} - 1\right)}. \quad (6)$$

Solving for N, we obtain:

$$N = \frac{\ln F}{W\left(\frac{p_r}{e}\right) + 1}, \text{ where } W \text{ is the Lambert function} \quad (7)$$

Note that N is the number of stages, i.e., the number of repeaters plus driver 202. Therefore, if N≥2, then the net that driver 202 is driving is a buffering candidate.

Filtering Approach: Lumped Load with One or More Repeaters

In this filtering approach, we create a simplified lumped wire model of the buffering problem where the candidate driver drives a wire with total/lumped resistance $R_w$, total lumped wire capacitance $C_w$, and total lumped pin capacitance $L=\Sigma_{i \in loads} L_i$. In this model, the driver $U_S$ (see FIG. 3) of the buffering candidate driver $U_C$ drives a net with total/lumped wire resistance $R_{ws}$ and total lumped wire capacitance $C_{ws}$. These parameters can be extracted from the Elmore wire RC tree or other wire load model. In some embodiments lumped/total wire capacitances as well as pin-to-pin delays are used to compute the lumped/total wire resistance. When the buffering candidate driver is a multi-input gate the method may use the most timing-critical input of the gate (and its electrically connected net and driver) for its model.

Figure 3:
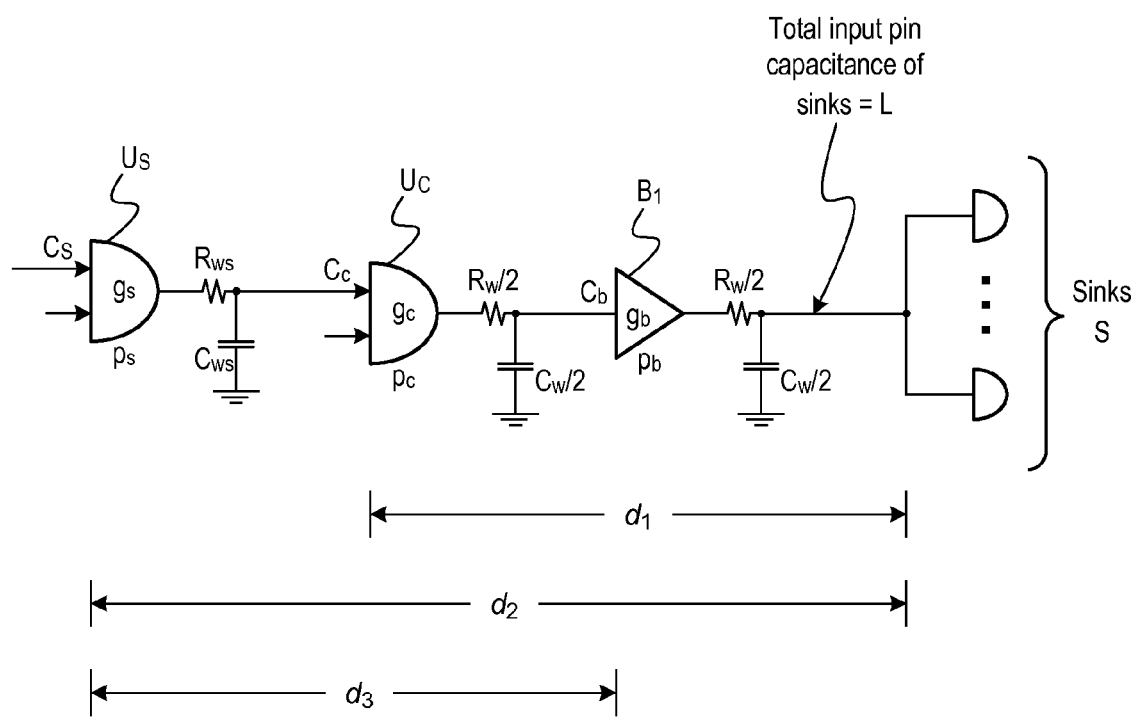
FIG. 3 illustrates a portion of a circuit design in accordance with some embodiments described herein.

FIG. 3 illustrates a portion of a circuit design in accordance with some embodiments described herein. Driver $U_S$ drives buffering candidate driver $U_C$, which drives the net as shown in FIG. 3. In the following discussion (and as illustrated in FIG. 3), we assume that one repeater is being added (i.e., repeater $B_1$) to the net that is being driven by buffering candidate driver $U_C$. Let $d_{1ORIG}$ and $d_{2ORIG}$ be the delays from the inputs of $U_C$ and $U_S$, respectively, to the sinks S before buffer $B_1$ is added to the net, and let $d_1$ and $d_2$ be the delays from the inputs of $U_C$ and $U_S$, respectively, to the sinks S after buffer $B_1$ is added to the net. The value of $d_{1ORIG}$ can be computed as follows:

$$d_{1ORIG} = \frac{g_c}{C_c} \cdot (C_w + L) + p_c + R_w \cdot (C_w + L), \quad (8)$$

where $g_c$ is the logical effort for $U_C$, $p_c$ is the parasitic delay for $U_C$, $C_c$ is the input capacitance of $U_C$, and L is the total load (i.e., total input capacitance) of sinks S.

Next, we present a closed form expression for computing the optimal buffer size $C_b$ for $B_1$ under the assumption that only one buffer is being added to the net. To derive the closed form expression we begin with the expression for delay $d_1$:

$$d_1 = \frac{g_c}{C_c} \cdot \left(\frac{C_w}{2} + C_b\right) + p_c + \quad (9)$$
$$\frac{R_w}{2} \cdot \left(\frac{C_w}{2} + C_b\right) + \frac{g_b}{C_b} \cdot \left(\frac{C_w}{2} + L\right) + p_b + \frac{R_w}{2} \cdot \left(\frac{C_w}{2} + L\right),$$

where $g_b$ is the logical effort for $B_1$, $p_b$ is the parasitic delay for $B_1$, and $C_b$ is the input capacitance of $B_1$. After taking the partial derivative of $d_1$ with respect to $C_b$, and setting it equal to zero, we obtain:

$$C_b = \left(\frac{g_b \cdot \left(\frac{C_w}{2} + L\right)}{\frac{g_c}{C_c} + \frac{R_w}{2}}\right)^{\frac{1}{2}}. \quad (10)$$

Once the $C_b$ value has been computed using Equation (10), some embodiments discretize the $C_b$ value to the input capacitance value of an actual library cell in the technology library. The discretized $C_b$ value is hereinafter referred to as $C_{bd}$. The $C_b$ value or the $C_{bd}$ value can be used in Equation (9) to compute $d_1$. Next, the system can compare $d_1$ with $d_{1ORIG}$ to determine whether or not buffering optimization should be performed on the net. Specifically, in some embodiments, buffering optimization is performed if $d_1 < d_{1ORIG}$. In other embodiments, buffering optimization is performed if $$\frac{d_1}{d_{1ORIG}} < \alpha,$$

where a is a constant.

In some embodiments, if the comparison between $d_1$ with $d_{1ORIG}$ indicates that buffering optimization should not be performed, then the embodiments can compute $d_2$ and $d_{2ORIG}$ (as explained below), and compare those two quantities with each other to determine whether or not buffering optimization should be performed. Specifically, $d_{2ORIG}$ can be computed as follows:

$$d_{2ORIG} = \frac{g_s}{C_s} \cdot (C_{ws} + C_c) + p_s + R_{ws} \cdot (C_{ws} + C_c) + d_{1ORIG}, \quad (11)$$

where $g_s$ is the logical effort for $U_S$, $p_s$ is the parasitic delay for $U_S$, $C_s$ is the input capacitance of $U_S$, and $R_{ws}$ and $C_{ws}$ are the lumped resistance and capacitance, respectively, of the net that electrically connects the output of $U_S$ with the input of $U_C$. Next, an optimal size for $U_C$ can be determined assuming the optimal buffer has been inserted. Specifically, let $d_3$ be the delay from the input of $U_S$ to the input of $U_C$ after buffer $B_1$ (with optimal size $C_b$ or $C_{bd}$ depending on whether or not we are discretizing the buffer size) is added to the net. Delay $d_3$ can be computed as follows:

$$d_3 = \frac{g_s}{C_s} \cdot (C_{ws} + C'_c) + p_s + R_{ws} \cdot (C_{ws} + C'_c) + \quad (12)$$
$$\frac{g_c}{C'_c} \cdot \left(\frac{C_w}{2} + C_b\right) + p_c + \frac{R_w}{2} \cdot \left(\frac{C_w}{2} + C_b\right),$$

where $C'_c$ is the optimal input capacitance value for $U_C$ when an optimal buffer is inserted into the net. After taking the partial derivative of $d_3$ with respect to $C'_c$, and setting it equal to zero, we obtain:

$$C'_c = \left(\frac{g_c \cdot \left(\frac{C_w}{2} + C_b\right)}{\frac{g_s}{C_s} + R_{ws}}\right)^{\frac{1}{2}}. \quad (13)$$

Once the optimal value of $C'_c$ is determined using Equation (13), some embodiments discretize the $C'_c$ value to the input capacitance value of an actual library cell in the technology library. The discretized $C'_c$ value is hereinafter referred to as $C'_{cd}$. The $C'_c$ value (or the $C'_{cd}$ value) can be used in the following Equation to compute $d_2$:

$$d_2 = \frac{g_s}{C_s} \cdot (C_{ws} + C'_c) + p_s + R_{ws} \cdot (C_{ws} + C'_c) + \frac{g_c}{C'_c} \cdot \left(\frac{C_w}{2} + C_b\right) + \quad (14)$$
$$p_c + \frac{R_w}{2} \cdot \left(\frac{C_w}{2} + C_b\right) + \frac{g_c}{C'_c} \cdot \left(\frac{C_w}{2} + C_b\right) + p_c +$$
$$\frac{R_w}{2} \cdot \left(\frac{C_w}{2} + C_b\right) + \frac{g_b}{C_b} \cdot \left(\frac{C_w}{2} + L\right) + p_b + \frac{R_w}{2} \cdot \left(\frac{C_w}{2} + L\right).$$

Next, the system can compare $d_2$ with $d_{2ORIG}$ to determine whether or not buffering optimization should be performed on the net. Specifically, in some embodiments, buffering optimization is performed if $d_2 < d_{2ORIG}$. In other embodiments, buffering optimization is performed if $$\frac{d_2}{d_{2ORIG}} < \alpha,$$

where α is a constant.

The above analysis assumed that a single buffer is inserted in the net. A similar analysis can be performed for cases where two or more buffers (e.g., B1, B2, ... B$_n$) are being added to the net. Specifically, when n buffers are used, the net is divided into (n+1) segments. Each segment can have a lumped capacitance of ($C_w$/(n+1)) and a lumped resistance of ($R_w$/(n+1)). The optimal buffer sizes can then be determined by using a numerical solver to optimize the net. Delays can be computed for the optimal "zero buffer solution," "one buffer solution," "two buffer solution," etc., and the buffering solution (and the corresponding number of buffers) that results in the best delay can then be returned as the optimal buffering solution.

Filtering Approach: Rule Based Repeater Topology Generation with Numerical Sizing of Repeaters and Candidate Drivers In this filter we utilize an existing rule-based repeater topology generator, but use the numerical sizing engine (e.g., operations 112 and 118 shown in FIG. 1) to determine the optimal sizes of the buffers as well as the candidate driver. Specifically, U.S. patent application Ser. No. 13/562,189, entitled "Determining optimal gate sizes by using a numerical solver" describes how a numerical method can be used to determine optimal gate sizes. The most run-time intensive part of a rule-based repeater insertion tool is the sizing of the repeaters that are placed at various locations on the original net. The actual repeater topology/tree generation (i.e. the exact location of repeaters, and the clustering of sinks and/or repeaters being driven by each repeater) consumes insignificant amount of run-time. Specifically, in some experiments, we have observed that more than 95% of a rule-based buffering tool's run-time is consumed by the sizing of the repeaters after the repeater tree has been generated. Given that numerical sizing approaches (e.g., the numerical sizing approach illustrated in FIG. 1) described in this disclosure are orders of magnitude faster than traditional sizing approaches, this filter combines the fast numerical sizing approach with a rule-based topology generation approach to create a very fast and accurate filter.

Specifically, some embodiments of this filtering approach can perform the following operations:

1. Generate the repeater topology/tree for the net.
2. If the topology cannot be generated, e.g., the topology generation rules (which typically segment the net into predetermined number of segments) cannot partition the net due to its short length, then return false (i.e., return a result that indicates that buffering should not be performed).
3. If the topology is generated, then use numerical sizing to size the repeaters as well as the candidate driver. Specifically, starting from the repeaters closest to the original net's loads and working backwards in a levelized manner, this embodiment can use numerical sizing to concurrently size the sinks of each of the wires in the repeater tree, ending with the sizing of the candidate driver. In some embodiments, we can include the sizing of the sinks of the original net, therefore the levelized numerical sizing process starts from sizing the sinks of the original net, and works its way backward in the buffer tree.
4. If the delay from the input of the candidate driver to the set of sinks (or the delay from the input of a source gate that drives the candidate driver to the set of sinks) improves as a result of buffering, then the filtering approach can determine that buffering should be performed on the net, and the buffering tool can proceed to perform buffering on the net. On the other hand, if the delay does not improve, the filtering approach can determine that buffering should not be performed on the net, and the buffering tool can skip performing buffering on the net.

In some embodiments, the filtering approach shown above can be used as the buffering approach itself (see FIG. 4B described below). In other words, if the delay from the input of the candidate driver to the set of sinks (or the delay from the input of a source gate that drives the candidate driver to the set of sinks) improves as a result of buffering, then the buffer tree (with the optimized buffer sizes and the optimized driver gate size) that was evaluated by the filter is outputted as the buffering solution.

Process for Identifying Candidate Nets for Buffering

Figure 4A:
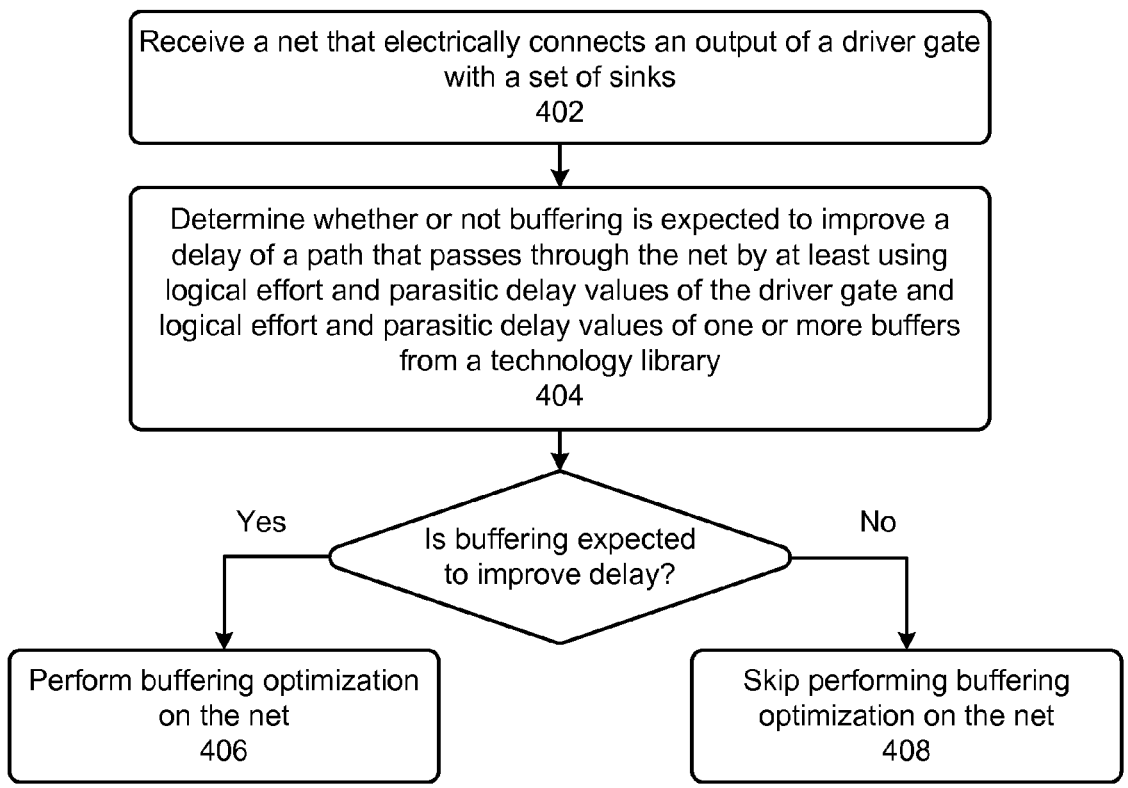
FIG. 4A illustrates a process for identifying candidate nets for buffering in accordance with some embodiments described herein.

FIG. 4A illustrates a process for identifying candidate nets for buffering in accordance with some embodiments described herein. The process can begin by receiving a net that electrically connects an output of a driver gate with a set of sinks (operation 402). For example, the net that electrically connects the output of driver gate $U_C$ with sinks S in FIG. 3 can be a net that is a buffering candidate. Even though multiple sinks are shown in FIG. 3, the set of sinks can sometimes include just one sink.

Next, the process can determine whether or not buffering is expected to improve a delay of a path that passes through the net by at least using logical effort and parasitic delay values of the driver gate and logical effort and parasitic delay values of one or more buffers from a technology library (operation 404). Specifically, one or more filtering approaches described in this disclosure can be used to determine whether or not buffering is expected to improve the delay of the path. The filtering approaches described in this disclosure can be used in any order and can be performed in parallel.

For example, in some embodiments, the process can compute the value of N using Equation (7). If N≥2, then the process can conclude that buffering is expected to improve delay of the path. If N<2, then the process can take different approaches. In one approach, the process can conclude that buffering is not expected to improve delay of the path. However, since Equation (7) is approximate, this approach can be suboptimal.

In another approach, if Equation (7) concludes that buffering should not be performed on the net, the process can use more accurate filters to determine whether or not the net is a buffering candidate. For example, the process can use Equations (8)-(10) to determine whether or not the net is a buffering candidate (i.e., whether or not the delay of the path is expected to decrease after buffering). If the net is a buffering candidate according to Equations (8)-(10), the process can conclude as such and proceed with the next operation. On the other hand, if the net is not a buffering candidate, then the process can then use Equations (11), (13), and (14) to determine whether or not the net is a buffering candidate. If the net is a buffering candidate according to Equations (11), (13), and (14), the process can conclude as such and proceed with the next operation. On the other hand, if the net is still not a buffering candidate, then the process can apply the "rule based repeater topology generation with numerical sizing of repeaters and candidate drivers" filter (see above) to determine whether or not the net is a buffering candidate. If the net is a buffering candidate according to this filter, the process can conclude as such and proceed with the next operation. On the other hand, if the net is still not a buffering candidate, then the process can conclude that the net is not a buffering candidate.

Once the process has determined whether or not a net is a buffering candidate, the process can perform an appropriate action. Specifically, if buffering is expected to improve the delay of the path ("YES" branch), then the process can perform buffering optimization on the net (operation 406). On the other hand, if buffering is not expected to improve the delay of the path ("NO" branch), then the process can skip performing buffering optimization on the net (operation 408).

Process for Performing Buffering Optimization

Figure 4B:
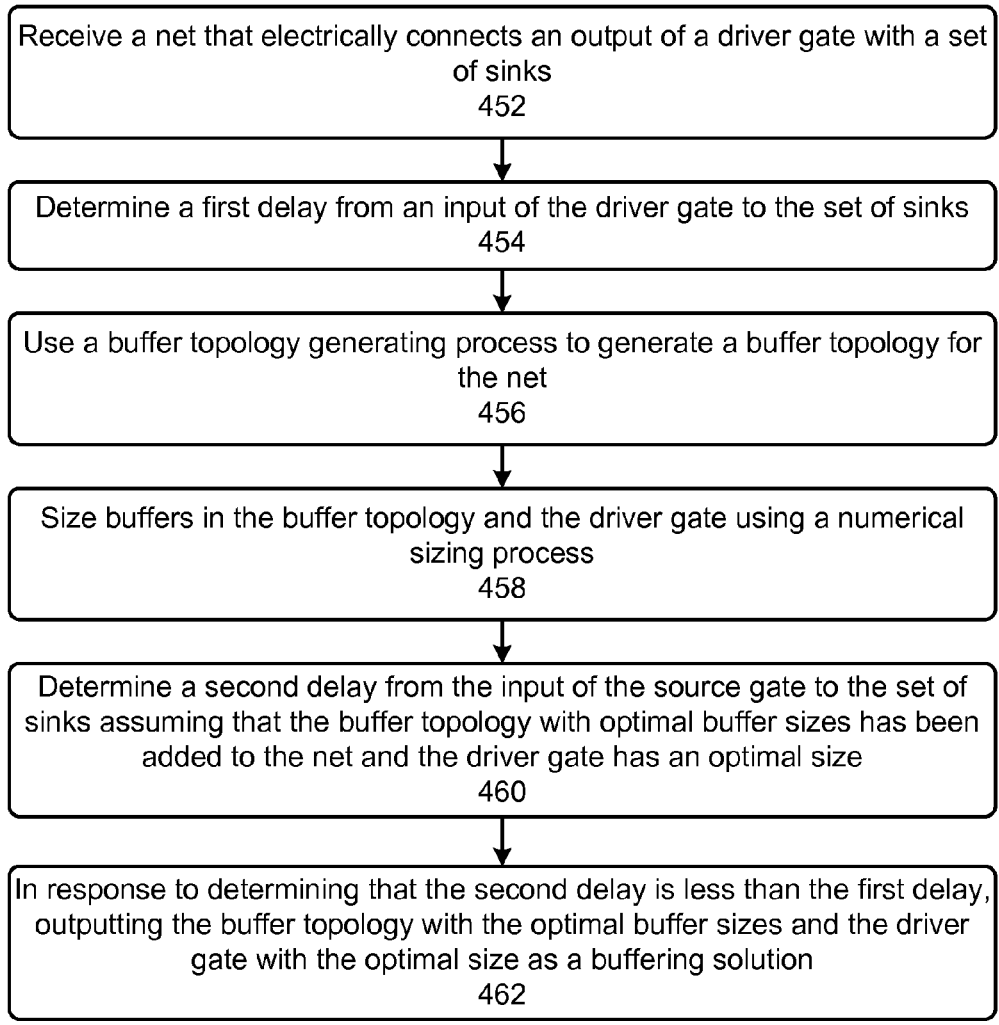
FIG. 4B illustrates a process for performing buffering optimization in accordance with some embodiments described herein.

FIG. 4B illustrates a process for performing buffering optimization in accordance with some embodiments described herein. The process can begin by receiving a net that electrically connects an output of a driver gate with a set of sinks (operation 452). For example, the net that electrically connects the output of driver gate $U_C$ with sinks S in FIG. 3 can be a net that is a buffering candidate. Even though multiple sinks are shown in FIG. 3, the set of sinks can sometimes include just one sink. Next, the process can determine a first delay from an input of the driver gate to the set of sinks (operation 454). The process can then use a buffer topology generating process to generate a buffer topology for the net (operation 456). Next, the process can size buffers in the buffer topology and the driver gate using a numerical sizing process (operation 458). The process can then determine a second delay from the input of the source gate to the set of sinks assuming that the buffer topology with optimal buffer sizes has been added to the net and the driver gate has an optimal size (operation 460). Next, in response to determining that the second delay is less than the first delay, the process can output the buffer topology with the optimal buffer sizes and the driver gate with the optimal size as a buffering solution (operation 462).

Computer System

Figure 5:
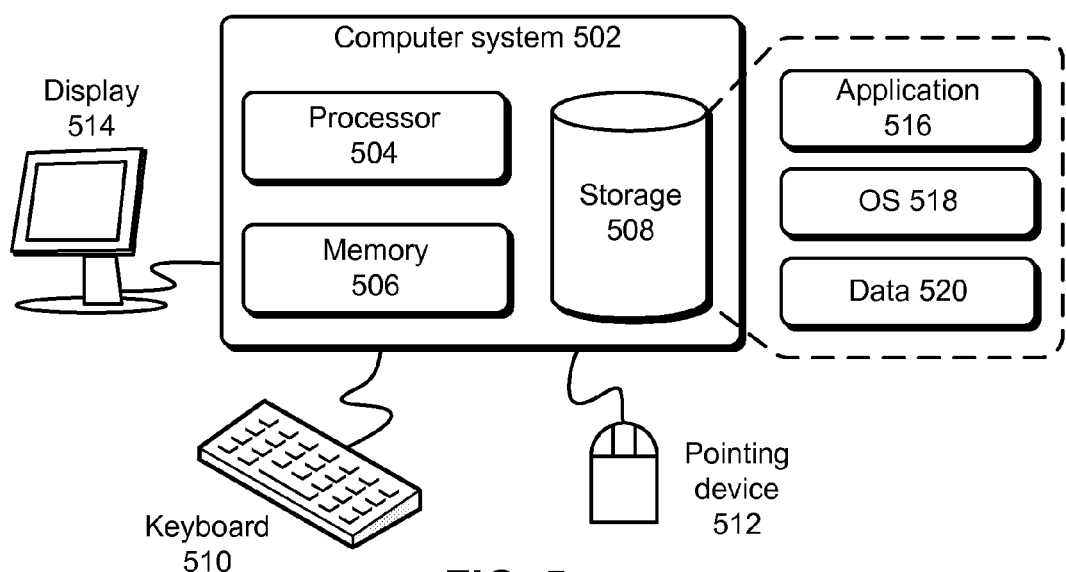
FIG. 5 illustrates a computer system in accordance with some embodiments described herein.

FIG. 5 illustrates a computer system in accordance with an embodiment of the present invention.

A computer or a computer system can generally be any system that can perform computations. Specifically, a computer system can be a microprocessor, an application specific integrated circuit, a distributed computing system, a cloud computing system, or any other computing system now known or later developed. Computer system 502 comprises processor 504, memory 506, and storage 508. Computer system 502 can be coupled with display 514, keyboard 510, and pointing device 512. Storage 508 can generally be any device that can store data. Specifically, a storage device can be a magnetic, an optical, or a magneto-optical storage device, or it can be based on flash memory and/or battery-backed up memory. Storage 508 can store application 516, operating system 518, and data 520.

Application 516 can include instructions that when executed by computer 502 cause computer 502 to perform one or more processes that are implicitly or explicitly described in this disclosure. Data 520 can include any data that is inputted into or outputted by application 516.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing buffering optimization, the method comprising:
   receiving a net that electrically connects an output of a driver gate with a set of sinks;
   determining, by computer whether or not buffering is expected to improve a delay of a path that passes through the net by at least using logical effort and parasitic delay values of the driver gate and logical effort and parasitic delay values of one or more buffers from a technology library, wherein said determining comprises:
   determining a first delay from an input of the driver gate to the set of sinks;
   determining optimal sizes for one or more candidate buffers that are being considered to be added to the net;
   determining a second delay from the input of the driver gate to the set of sinks assuming that the one or more candidate buffers with their optimal sizes have been added to the net; and
   determining whether or not buffering is expected to improve the delay of the path based on comparing the first delay with the second delay;
   in response to determining that buffering is expected to improve the delay of the path, performing buffering optimization on the net; and
   in response to determining that buffering is not expected to improve the delay of the path, skipping performing buffering optimization on the net.

2. The method of claim 1, wherein determining whether or not buffering is expected to improve the delay of the path includes:
   evaluating a closed-form expression that returns the optimal number of buffers on the net; and
   determining whether or not buffering is expected to improve the delay of the path based on the value returned by the closed-form expression.

3. The method of claim 1, wherein said determining optimal sizes for one or more candidate buffers comprises evaluating a closed-form expression for each candidate buffer.

4. The method of claim 1, wherein determining whether or not buffering is expected to improve the delay of the path includes:
   determining a first delay from an input of a source gate to the set of sinks, wherein an output of the source gate is electrically connected to the input of the driver gate;
   evaluating a closed-form expression to determine an optimal size for each candidate buffer that is being added to the net, wherein the optimal size for each candidate buffer can be determined with or without discretization;
   evaluating a closed-form expression to determine an optimal size for the driver gate based on the optimal sizes for the candidate buffers, wherein the optimal buffer size for the driver gate can be determined with or without discretization;
   determining a second delay from the input of the source gate to the set of sinks assuming that the one or more buffers with their optimal sizes have been added to the net and the driver gate has the optimal size; and
   determining whether or not buffering is expected to improve the delay of the path based on comparing the first delay with the second delay.

5. The method of claim 1, wherein determining whether or not buffering is expected to improve the delay of the path includes:
   determining a first delay from an input of the driver gate to the set of sinks;
   using a buffer topology generating process to generate a buffer topology for the net;
   if the buffer topology generating process was unable to generate a buffer topology, determining that buffering is not expected to improve the delay of the path; and
   if the buffer generating process was able to generate a buffer topology,
      sizing buffers and the driver gate using a numerical sizing process,
      determining a second delay from the input of the source gate to the set of sinks assuming that the one or more buffers with their optimal buffer sizes have been added to the net and the driver gate has the optimal gate size, and
      determining whether or not buffering is expected to improve the delay of the path based on comparing the first delay with the second delay.

6. A non-transitory computer-readable storage medium storing instructions that, when executed by a computer, cause the computer to execute a method for performing buffering optimization, the method comprising:
   receiving a net that electrically connects an output of a driver gate with a set of sinks;
   determining whether or not buffering is expected to improve a delay of a path that passes through the net by at least using logical effort and parasitic delay values of the driver gate and logical effort and parasitic delay values of one or more buffers from a technology library, wherein said determining comprises:
   determining a first delay from an input of the driver gate to the set of sinks;
   determining optimal sizes for one or more candidate buffers that are being considered to be added to the net;
   determining a second delay from the input of the driver gate to the set of sinks assuming that the one or more candidate buffers with theft optimal sizes have been added to the net; and
   determining whether or not buffering is expected to improve the delay of the path based on comparing the first delay with the second delay;
   in response to determining that buffering is expected to improve the delay of the path, performing buffering optimization on the net; and in response to determining that buffering is not expected to improve the delay of the path, skipping performing buffering optimization on the net.

7. The non-transitory computer-readable storage medium of claim 6, wherein determining whether or not buffering is expected to improve the delay of the path includes:
evaluating a closed-form expression that returns the optimal number of buffers on the net; and
determining whether or not buffering is expected to improve the delay of the path based on the value returned by the closed-form expression.

8. The non-transitory computer-readable storage medium of claim 6, wherein said determining optimal sizes for one or more candidate buffers comprises evaluating a closed-form expression for each candidate buffer.

9. The non-transitory computer-readable storage medium of claim 6, wherein determining whether or not buffering is expected to improve the delay of the path includes:
determining a first delay from an input of a source gate to the set of sinks, wherein an output of the source gate is electrically connected to the input of the driver gate;
evaluating a closed-form expression to determine an optimal size for each candidate buffer that is being added to the net, wherein the optimal size for each candidate buffer can be determined with or without discretization;
evaluating a closed-form expression to determine an optimal size for the driver gate based on the optimal sizes for the candidate buffers, wherein the optimal buffer size for the driver gate can be determined with or without discretization;
determining a second delay from the input of the source gate to the set of sinks assuming that the one or more buffers with their optimal sizes have been added to the net and the driver gate has the optimal size; and
determining whether or not buffering is expected to improve the delay of the path based on comparing the first delay with the second delay.

10. The non-transitory computer-readable storage medium of claim 6, wherein determining whether or not buffering is expected to improve the delay of the path includes:
determining a first delay from an input of the driver gate to the set of sinks;
using a buffer topology generating process to generate a buffer topology for the net;
if the buffer topology generating process was unable to generate a buffer topology, determining that buffering is not expected to improve the delay of the path; and
if the buffer generating process was able to generate a buffer topology,
sizing buffers and the driver gate using a numerical sizing process,
determining a second delay from the input of the source gate to the set of sinks assuming that the one or more buffers with their optimal buffer sizes have been added to the net and the driver gate has the optimal gate size, and
determining whether or not buffering is expected to improve the delay of the path based on comparing the first delay with the second delay.

11. An apparatus, comprising:
a processor; and
a non-transitory computer-readable storage medium storing instructions that, when executed by the processor, cause the apparatus to execute a method for performing buffering optimization, the method comprising:
receiving a net that electrically connects an output of a driver gate with a set of sinks;
determining whether or not buffering is expected to improve a delay of a path that passes through the net by at least using logical effort and parasitic delay values of the driver gate and logical effort and parasitic delay values of one or more buffers from a technology library, wherein said determining comprises:
determining a first delay from an input of the driver gate to the set of sinks;
determining optimal sizes for one or more candidate buffers that are being considered to be added to the net;
determining a second delay from the input of the driver gate to the set of sinks assuming that the one or more candidate buffers with their optimal sizes have been added to the net; and
determining whether or not buffering is expected to improve the delay of the path based on
comparing the first delay with the second delay;
in response to determining that buffering is expected to improve the delay of the path,
performing buffering optimization on the net; and
in response to determining that buffering is not expected to improve the delay of the path, skipping performing buffering optimization on the net.

12. The apparatus of claim 11, wherein determining whether or not buffering is expected to improve the delay of the path includes:
evaluating a closed-form expression that returns the optimal number of buffers on the net; and
determining whether or not buffering is expected to improve the delay of the path based on the value returned by the closed-form expression.

13. The apparatus of claim 11, wherein said determining optimal sizes for one or more candidate buffers comprises evaluating a closed-form expression for each candidate buffer.

14. The apparatus of claim 11, wherein determining whether or not buffering is expected to improve the delay of the path includes:
determining a first delay from an input of a source gate to the set of sinks, wherein an output of the source gate is electrically connected to the input of the driver gate;
evaluating a closed-form expression to determine an optimal size for each candidate buffer that is being added to the net, wherein the optimal size for each candidate buffer can be
determined with or without discretization;
evaluating a closed-form expression to determine an optimal size for the driver gate based on the optimal sizes for the candidate buffers, wherein the optimal buffer size for the driver gate can be determined with or without discretization;
determining a second delay from the input of the source gate to the set of sinks assuming that the one or more buffers with their optimal sizes have been added to the net and the driver gate has the optimal size; and
determining whether or not buffering is expected to improve the delay of the path based on comparing the first delay with the second delay.

15. The apparatus of claim 11, wherein determining whether or not buffering is expected to improve the delay of the path includes:
determining a first delay from an input of the driver gate to the set of sinks;

using a buffer topology generating process to generate a buffer topology for the net;

if the buffer topology generating process was unable to generate a buffer topology, determining that buffering is not expected to improve the delay of the path; and if the buffer generating process was able to generate a buffer topology, sizing buffers and the driver gate using a numerical sizing process, determining a second delay from the input of the source gate to the set of sinks assuming that the one or more buffers with their optimal buffer sizes have been added to the net and the driver gate has the optimal gate size, and determining whether or not buffering is expected to improve the delay of the path based on comparing the first delay with the second delay.

* * * * *